United States Patent
Kadomae (10) Patent No.: US 11,330,189 B2
(45) Date of Patent: May 10, 2022

(54) IMAGING CONTROL DEVICE FOR MONITORING A VEHICLE OCCUPANT

(71) Applicant: AISIN CORPORATION, Kariya (JP)

(72) Inventor: Kazuhito Kadomae, Kariya (JP)

(73) Assignee: AISIN CORPORATION, Kariya (JP)

( * ) Notice: Subject to any disclaimer, the term of this patent is extended or adjusted under 35 U.S.C. 154(b) by 56 days.

(21) Appl. No.: 16/898,949

(22) Filed: Jun. 11, 2020

(65) Prior Publication Data
US 2020/0404147 A1 Dec. 24, 2020

(30) Foreign Application Priority Data
Jun. 18, 2019 (JP) .............................. JP2019-112748

(51) Int. Cl.
*H04N 5/235* (2006.01)
*B60R 11/04* (2006.01)
*H04N 5/225* (2006.01)

(52) U.S. Cl.
CPC .......... *H04N 5/2352* (2013.01); *B60R 11/04* (2013.01); *H04N 5/2253* (2013.01)

(58) Field of Classification Search
CPC ...... H04N 5/2253; H04N 5/33; H04N 5/2352; H04N 5/2353; H04N 5/23218; B60R 11/04
See application file for complete search history.

(56) References Cited

U.S. PATENT DOCUMENTS

| | | | | |
|---|---|---|---|---|
| 6,914,526 B2* | 7/2005 | Wallace | .............. | B60R 25/1004 340/540 |
| 6,968,073 B1* | 11/2005 | O'Boyle | ............ | G06K 9/00362 340/933 |
| 7,925,152 B2* | 4/2011 | Lien | ...................... | H04N 5/2351 348/364 |
| 8,059,867 B2* | 11/2011 | Aoki | ...................... | G06K 9/209 382/104 |
| 8,195,356 B2* | 6/2012 | Allen | .................... | G01M 17/00 701/32.8 |
| 2003/0223617 A1* | 12/2003 | Wallace | ............... | G06K 9/6282 382/104 |
| 2004/0032493 A1* | 2/2004 | Franke | ..................... | B60R 1/00 348/148 |

(Continued)

FOREIGN PATENT DOCUMENTS

| | | |
|---|---|---|
| JP | 2018-503515 A | 2/2018 |
| JP | 2019-016893 A | 1/2019 |
| WO | 2016/100950 A2 | 6/2016 |

*Primary Examiner* — William C Vaughn, Jr.
*Assistant Examiner* — Naod W Belai
(74) *Attorney, Agent, or Firm* — Sughrue Mion, PLLC (57) ABSTRACT

An imaging control device includes: an exposure control portion configured to control an exposure length of an imaging unit, which is capturable an image of a region where an occupant is allowed to occupy in a vehicle cabin, to at least a first exposure period and a second exposure period longer than the first exposure period; an image acquisition portion configured to acquire first captured image data captured in the first exposure period and second captured image data captured in the second exposure period; and a processing unit configured to separately process the first captured image data and the second captured image data.

5 Claims, 7 Drawing Sheets

(56) References Cited

U.S. PATENT DOCUMENTS

| | | | |
|---|---|---|---|
| 2005/0090957 A1* | 4/2005 | Luo | B60R 21/01538 701/45 |
| 2006/0155442 A1* | 7/2006 | Luo | G06T 7/73 701/45 |
| 2006/0198626 A1* | 9/2006 | Nakamura | B60R 1/008 396/234 |
| 2006/0256197 A1* | 11/2006 | Fultz | G06K 9/00369 348/148 |
| 2006/0280336 A1* | 12/2006 | Lee | G06K 9/00201 382/104 |
| 2007/0206836 A1* | 9/2007 | Yoon | G06T 7/586 382/104 |
| 2008/0094195 A1* | 4/2008 | Odate | B60R 21/01534 340/438 |
| 2008/0186701 A1* | 8/2008 | Omi | G06K 9/2027 362/231 |
| 2008/0255731 A1* | 10/2008 | Mita | B60R 21/01538 701/45 |
| 2008/0303915 A1* | 12/2008 | Omi | G06K 9/00255 348/222.1 |
| 2009/0092284 A1* | 4/2009 | Breed | G01S 7/4802 382/103 |
| 2013/0107002 A1* | 5/2013 | Kikuchi | H04N 5/23229 348/46 |
| 2013/0314536 A1* | 11/2013 | Frank | H04N 5/2257 348/148 |
| 2014/0098997 A1* | 4/2014 | Faber | B60Q 1/143 382/103 |
| 2016/0063334 A1* | 3/2016 | Yasuda | H04N 5/2352 348/148 |
| 2016/0175964 A1 | 6/2016 | Penoyer et al. | |
| 2017/0313248 A1* | 11/2017 | Kothari | B60R 11/04 |
| 2017/0334357 A1* | 11/2017 | Lewis | G06T 7/11 |
| 2018/0065582 A1* | 3/2018 | Miller | B60R 21/01552 |
| 2018/0343375 A1* | 11/2018 | Duran | H04N 5/2351 |
| 2019/0266425 A1* | 8/2019 | Iwai | G06T 7/73 |
| 2020/0337139 A1* | 10/2020 | Hiramatsu | B60Q 3/70 |

* cited by examiner

IMAGING CONTROL DEVICE FOR MONITORING A VEHICLE OCCUPANT

CROSS REFERENCE TO RELATED APPLICATIONS

This application is based on and claims priority under 35 U.S.C. § 119 to Japanese Patent Application 2019-112748, filed on Jun. 18, 2019, the entire contents of which are incorporated herein by reference.

TECHNICAL FIELD

The present disclosure relates to an imaging control device.

BACKGROUND DISCUSSION

In recent years, technologies have been known for using an image of a target region captured by an imaging unit (camera) to detect an object captured in the target region or detecting a posture of the object, a surrounding condition, or the like, which are used for grasping a situation, performing a control, and so on. When the captured image is used for grasping a situation and performing a control as described above, accuracy is likely to depend on the quality of the captured image. For example, depending on the surrounding environment (for a visible light camera, a difference between brightness and darkness, for an infrared camera, a difference in temperature, for example), "blown-out white" or "crushed black" may occur in a part of the captured image, and the content of the captured image may not be accurately recognized. Therefore, various techniques have been proposed for capturing a bright image and a dark image to generate a composite image, thereby increasing a dynamic range, and improving recognizability. JP 2018-503515T and JP 2019-16893A are examples of the related art.

However, when image composition is performed as proposed in the above-mentioned references, the number of bits of the composite image increases, which leads to increase in the processing load, which in turn requires a high-performance processing device, or requires a measure against heat radiation to cope with an increase in heat generation due to high processing load. In this way, the above factors may be the cause of increasing the overall cost of devices.

A need thus exists for an imaging control device which is not susceptible to the drawback mentioned above.

SUMMARY

An imaging control device according to an aspect of this disclosure includes, for example, an exposure control portion configured to control an exposure length of an imaging unit, which is capturable an image of a region where an occupant is allowed to occupy in a vehicle cabin, to at least a first exposure period and a second exposure period longer than the first exposure period, an image acquisition portion configured to acquire first captured image data captured in the first exposure period and second captured image data captured in the second exposure period, and a processing unit configured to separately process the first captured image data and the second captured image data.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the present disclosure will be described with reference to the drawings. The configuration of the embodiment to be described below, and the operation and effect provided by the configuration are merely examples, and are not limited to the following description.

Figure 1:
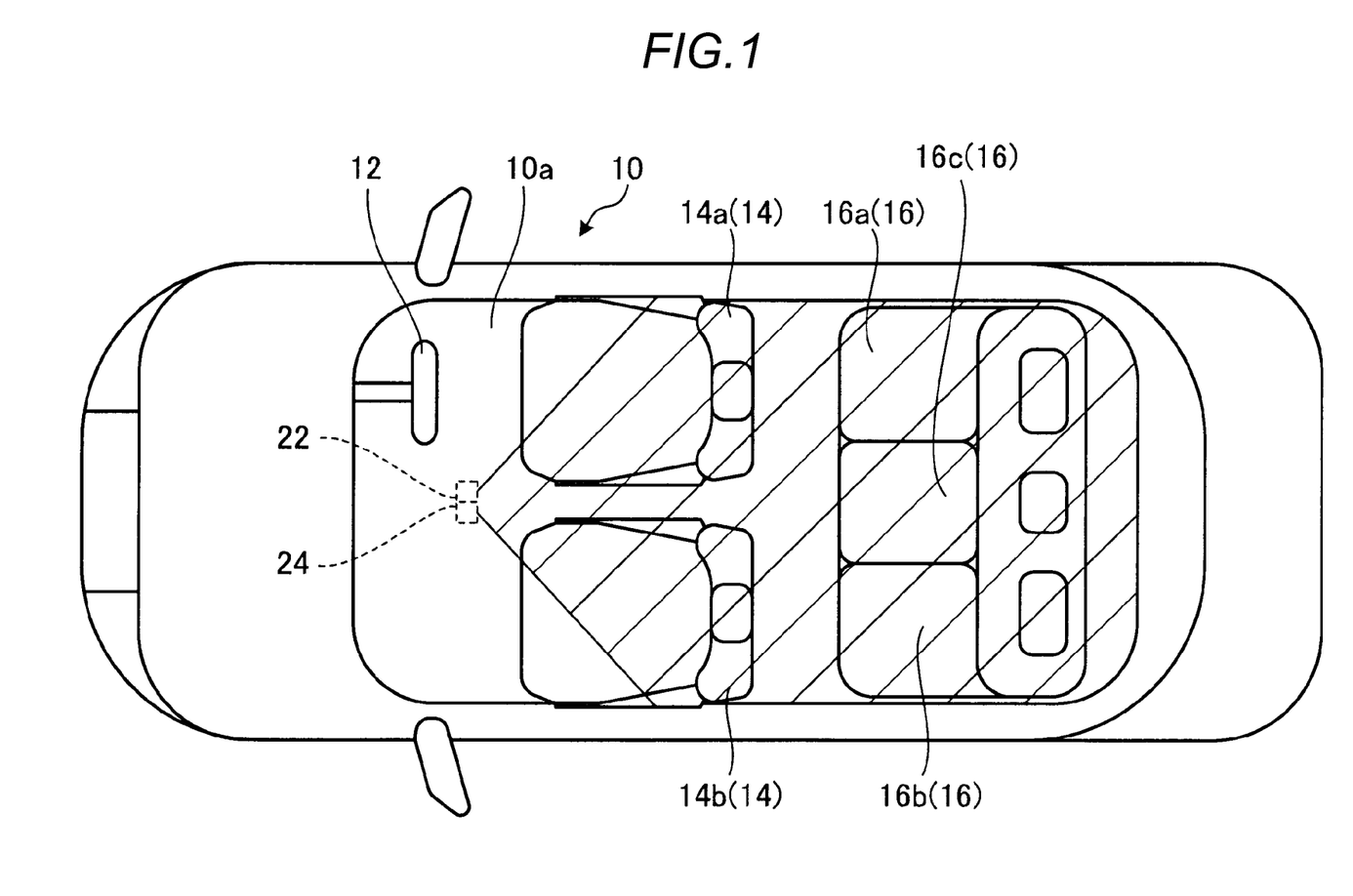
FIG. 1 is an exemplary schematic diagram illustrating a configuration of a vehicle on which an imaging control device according to an embodiment can be mounted and an image-capturing range in the vehicle.

FIG. 1 is an exemplary schematic diagram illustrating a configuration of a vehicle 10 to which an imaging control device according to an embodiment is applied and an image-capturing range of an imaging unit in the vehicle 10. The imaging control device according to the present embodiment performs control for acquiring captured image data for detecting (recognizing) a situation in a vehicle cabin 10a of the vehicle 10. Examples of the situations in the vehicle cabin 10a includes, for example, whether or not an occupant is present in the vehicle cabin 10a (boarding status), the posture of the occupant, and the usage situation of equipment by the occupant in the vehicle cabin 10a. In addition, the situation in the vehicle cabin 10a can include the presence or absence of an object (package, living thing, or the like) brought into the vehicle cabin 10a.

In the embodiment, the vehicle 10 on which the imaging control device (imaging control portion) is mounted may be, for example, a vehicle driven by an internal combustion engine (not shown), that is, an internal combustion engine automobile, and may be a vehicle driven by the electric motor (not shown), that is, an electric vehicle or a fuel cell vehicle. Further, the vehicle may be a hybrid vehicle using both of the internal combustion engine and the electric motor as drive sources, and may be a vehicle provided with another drive source.

As illustrated in FIG. 1, the vehicle 10 includes the vehicle cabin 10a in which an occupant (driver, passenger)

(not shown) rides. In the vehicle cabin 10a, for example, a seat 14a for a driver (drivers seat) located at a position facing a steering wheel 12, and a seat 14b for a passenger (passenger seat) located next to the seat 14a are disposed as a front row seats 14 (front seats). In addition, for example, passenger seats 16a, 16b, and 16c are disposed as a rear row seats 16 (rear seats). Although FIG. 1 shows an example of a five-seat (five-seater) car having front row seats 14 of two seats and rear row seats 16 of three seats, the seat layout can be appropriately selected according to, for example, the type of vehicle. For example, the rear row seats 16 may include two seats (which is combined with the front row seats 14 to make a four-seater car). Further, a three-row seat configuration or a more than three-row configuration may be employed. For occupants, the front row seats 14 may be one row, and the rear of the front row seats 14 may be a package space.

Figure 2:
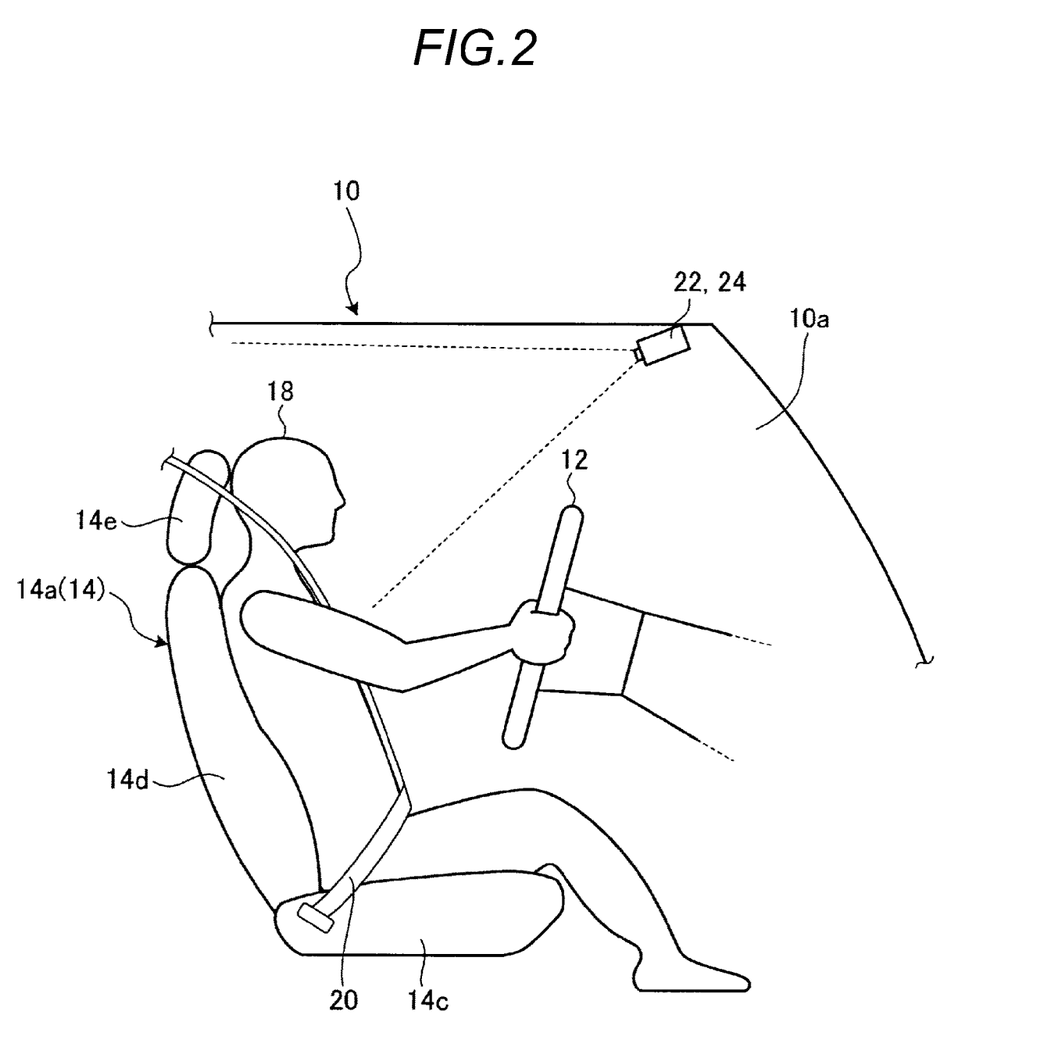
FIG. 2 is an exemplary schematic diagram illustrating a captured image of occupant sitting on a front seat and a disposition of an imaging unit in the vehicle on which the imaging control device according to the embodiment is mounted.

FIG. 2 is an exemplary schematic diagram illustrating a captured image of an occupant 18 sitting on the front row seats 14 (seat 14a) and a disposition of the imaging unit in the vehicle 10 on which the imaging control device according to the embodiment is mounted.

The front row seats 14 (seat 14a) include a seat cushion 14c, a seat back 14d, a headrest 14e, and the like, and a frame (not shown) supporting the seat cushion 14c and is fixed to the floor surface of the vehicle cabin 10a by rails to be adjustable in the vehicle front-rear direction. The front row seats 14 are provided with various adjustment mechanisms such as a reclining mechanism, and thereby the posture of the occupant 18 (driver) wearing a seat belt 20 and holding the steering wheel 12 is adjusted to be easily maintained in a state suitable for driving.

As described above, in order to detect (recognize) the situation in the vehicle cabin 10a, the imaging control device according to the embodiment includes, for example, an infrared imaging unit 22 as an imaging unit at a position overlooking the interior of the vehicle cabin 10a. In addition, an infrared irradiation unit 24 is disposed in the proximity of the infrared imaging unit 22. In the embodiment, the infrared imaging unit 22 and the infrared irradiation unit 24 are disposed substantially at a central and upper part inward of the windshield of the vehicle 10 (for example, near a rear-view mirror). In addition, the infrared imaging unit 22 may be disposed at another position as long as the interior of the vehicle cabin 10a can be viewed. As long as the entire image-capturing region of the infrared imaging unit 22 can be irradiated with infrared light, the position of the infrared irradiation unit 24 can be also changed as appropriate, and the infrared imaging unit 22 and the infrared irradiation unit 24 may be disposed even at different positions. Further, the infrared imaging unit 22 and the infrared irradiation unit 24 may be configured as an integrated camera unit.

The infrared imaging unit 22 is, for example, a digital camera having a built-in imaging device such as a charge coupled device (CCD) or a CMOS image sensor (CIS) that supports infrared image-capturing. The infrared imaging unit 22 can sequentially output moving image data (captured image data) at a predetermined frame rate. The infrared irradiation unit 24 can be, for example, a light emitting diode (LED) light or the like that emits infrared rays. As shown by hatching in FIG. 1, the infrared imaging unit 22 captures, for example, an image of a region where the occupant 18 can get on (the region where the front row seats 14 and the rear row seats 16 are located) in the vehicle cabin 10a with one unit. Further, the irradiation angle and irradiation intensity of the infrared irradiation unit 24 are set such that the region including at least the image-capturing range of the infrared imaging unit 22 can be irradiated with infrared light.

The viewing angle and the posture of the infrared imaging unit 22 are adjusted and fixed such that at least occupants 18 sitting on the front row seats 14 and the rear row seats 16 are included in the image-capturing region. For example, as shown in FIG. 2, when the occupant 18 is seated on the seat 14a (drivers seat), the image-capturing region of the infrared imaging unit 22 includes the face and at least the upper body of the occupant 18. Similarly, when the occupant 18 is seated on the seat 14b (passenger seat), the face and at least the upper body of the occupant 18 are included. When occupants 18 are sitting on the seats 16a to 16c of the rear row seats 16, the faces and at least the upper bodies of the occupants 18 are included.

The infrared irradiation unit 24 irradiates the occupants 18 seated on the seat 14a, the seat 16a, or the like with infrared light, but since human eyes does not recognize the infrared light as light, the occupants 18 does not feel glare even when the infrared rays are emitted in the direction of the faces of the occupants 18. Therefore, it is possible to easily implement the image-capturing of occupants 18 and the like with the infrared imaging unit 22 while securing the comfort of the occupants 18 in the vehicle cabin 10a.

As shown in FIG. 1, when the infrared imaging unit 22 and the infrared irradiation unit 24 are disposed in the front part of the vehicle cabin 10a, there is a likeliness that, in the captured infrared image, an image-capturing quality is not high enough to identify the details of the captured image accurately over the entire region of the front row seats 14 and the rear row seats 16. For example, since the distance from the infrared imaging unit 22 to the rear row seats 16 is larger than the distance to the front row seats 14 and thus the light (infrared ray) reflected by the rear row seats 16 is more attenuated than the light reflected by the front row seats 14, the captured infrared image tends to darken. In this case, it is assumed that image-capturing is performed in the vicinity of the region of the front row seats 14 which are relatively close to the infrared imaging unit 22 (hereinafter, may be referred to as a first region) such that a captured infrared image can have a brightness that can be used for control or the like. In this case, in the captured infrared image, the attenuation of the reflected light increases in the vicinity of the region of the rear row seats 16 (hereinafter, also referred to as a second region) which are relatively far from the infrared imaging unit 22, and "crushed black" is more likely to occur. As a result, the captured image of the second region is difficult to use for control or the like. In contrast, it is assumed that image-capturing is performed in the vicinity of the second region including the rear row seats 16 to obtain a captured infrared image having a brightness that can be used for control or the like. In this case, in the captured image, the attenuation of the reflected light is relatively small in the vicinity of the first region including the front row seats 14 which are relatively close to the infrared imaging unit 22, and thus the amount of received light increases, and "blown-out white" is more likely to occur. As a result, the captured image of the first region is difficult to use for control or the like.

Therefore, in the imaging control device of the embodiment, when the infrared imaging unit 22 sequentially captures images of the interior of the vehicle cabin 10a and outputs infrared captured image data (hereinafter simply referred to as captured image data) at a predetermined frame rate, the exposure control is performed to output the first captured image data exposed and captured for the first region including the front row seats 14 and the second captured image data exposed and captured for the second region including the rear row seats 16 in an alternating manner, for example. That is, the first captured image data captured by the infrared ray that can express the first region with appropriate brightness for the front row seats 14, and the second captured image data captured by the infrared ray that can express the second region with appropriate brightness for the rear row seats 16 are acquired, and each captured image data is processed (dealt with) independently to be used for, for example, various monitoring controls. Examples of the monitoring control using the first captured image data and the second captured image data include control for detecting the presence or absence of the occupant 18 and the load, identification control thereof, control for detecting whether or not the seat belt 20 is worn, and warning control when the seat belt 20 is not worn, and gesture detection control when the occupant 18 operates a vehicle-mounted device. Further, it can be used for, for example, control for detecting a lost object in the vehicle cabin 10a. In addition, by further analyzing the first captured image data and the second captured image data, for example, determination of the drowsiness level of a driver, control of an airbag, identification of the occupant 18 sitting on the front row seats 14 and the rear row seats 16, for example, identification of an adult male, an adult female, a child, or the like, can be performed, and appropriate control can be performed. In these cases, the composite process of the first captured image data and the second captured image data is not performed and each captured image data is used for control. As a result, the image composition process is not needed, and thus the processing load can be reduced, which can lead to reduction in the device cost.

Figure 3:
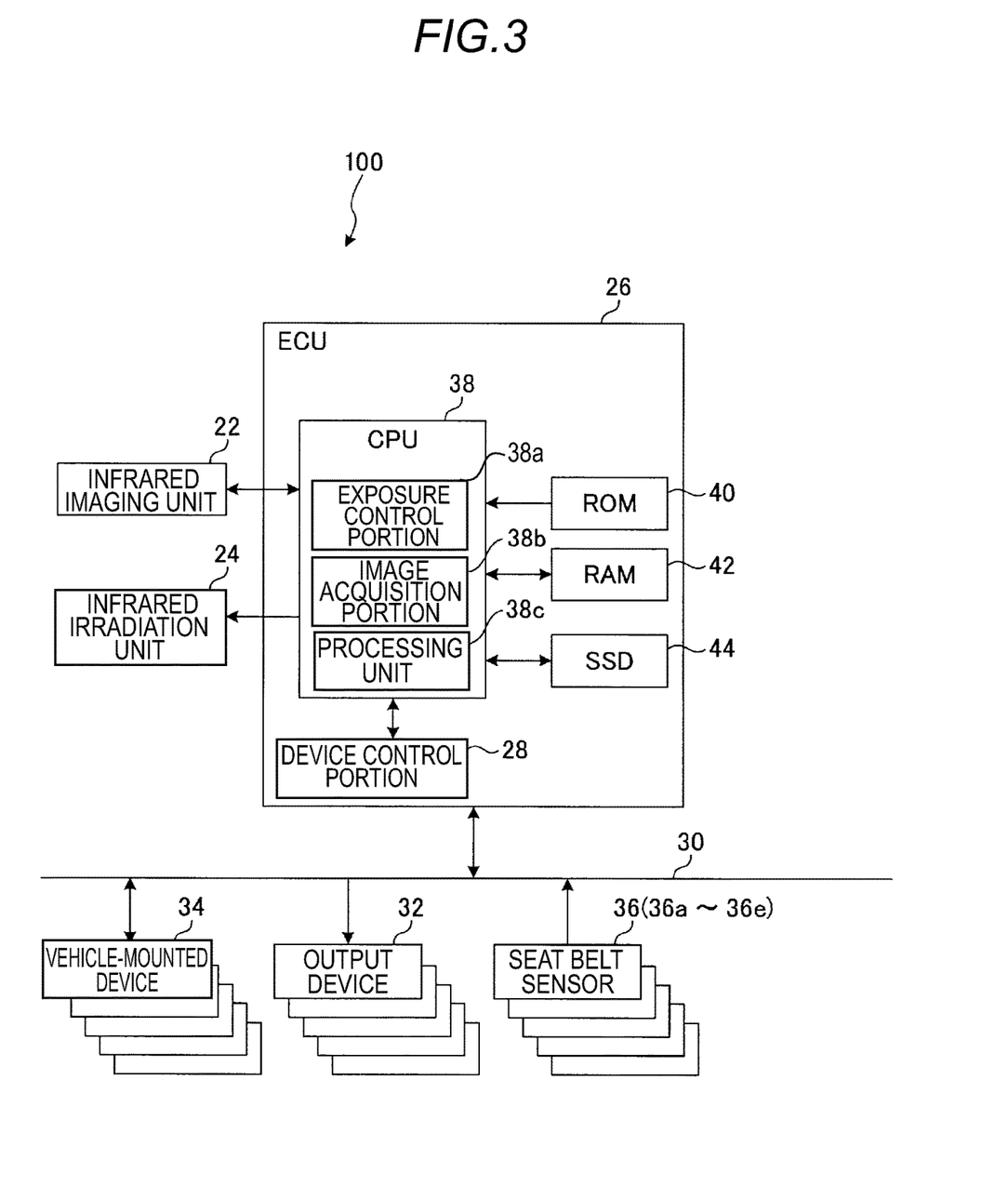
FIG. 3 is an exemplary schematic block diagram illustrating a schematic hardware configuration of a monitoring control system including an imaging control device (imaging control portion) according to the embodiment.

FIG. 3 is an exemplary schematic block diagram illustrating a configuration of the imaging control device (imaging control portion) for performing the image-capturing control as described above. FIG. 3 illustrates a monitoring control system 100 including an electronic control unit (ECU) 26, which functions as an imaging control device (imaging control portion), and a device control portion 28, which is included in the ECU 26 and performs various monitoring controls in the vehicle 10 using the first captured image data and the second captured image data acquired by the imaging control device.

As shown in FIG. 3, the ECU 26 controls the infrared imaging unit 22 and the infrared irradiation unit 24 to perform image-capturing, and provides the acquired first captured image data and second captured image data to the device control portion 28. The device control portion 28 controls an output device 32 and a vehicle-mounted device 34 that are electrically connected through an in-vehicle network 30. The in-vehicle network 30 may be, for example, a controller area network (CAN). Further, the in-vehicle network 30 is electrically connected to various sensors referred to when the device control portion 28 performs control. In FIG. 3, as an example, the seat belt sensors 36 (36a to 36e) for detecting whether or not seat belts 20 mounted on the front row seats 14 and the rear row seats 16 are worn are shown.

The ECU 26 has, for example, a read only memory (ROM) 40, a random access memory (RAM) 42, a solid state drive (SSD) (or flash memory) 44, and the like, in addition to the device control portion 28, a central processing unit (CPU) 38. For example, the CPU 38 can read a program installed and stored in a non-volatile storage device such as the ROM 40 and execute calculation processing according to the program. The RAM 42 temporarily stores various data used in the calculation by the CPU 38. The SSD 44 is a rewritable nonvolatile storage unit, and can store data even when the power of the ECU 26 is turned off. The device control portion 28, the CPU 38, the ROM 40, the RAM 42 and the like can be integrated in the same package. Further, the ECU 26 may be constituted by using another logical operation processor or a logical circuit such as a digital signal processor (DSP) instead of the CPU 38. Further, a hard disk drive (HDD) may be provided instead of the SSD 44, and the SSD 44 and the HDD may be provided separately from the ECU 26. The ECU 26 functioning as an imaging control device (imaging control portion) may be constructed by CPUs of a plurality of other ECUs that control the vehicle 10. In FIG. 3 an example in which the device control portion 28 is implemented as an independent module in the ECU 26 is shown. In another embodiment, the device control portion 28 may be constructed by the CPU 38 executing a program installed in the ROM 40 or the like, or may be provided independently of the ECU 26.

The CPU 38 can read a program installed and stored in a storage device such as the ROM 40 and execute the program to construct an exposure control portion 38a, an image acquisition portion 38b, a processing unit 38c, and the like.

The exposure control portion 38a controls the exposure length of the infrared imaging unit 22 capable of capturing an image of the region (the first region including the front row seats 14 and the second region including the rear row seats 16) to be occupied by the occupants 18 in the vehicle cabin 10a, at least to the first exposure period and the second exposure period longer than the first exposure period. The image acquisition portion 38b acquires first captured image data captured in the first exposure period and second captured image data captured in the second exposure period, and temporarily stores the acquired data in a storage device such as the RAM 42 sequentially. The processing unit 38c separately processes the first captured image data and the second captured image data and provides the processed data to the device control portion 28 to perform various controls.

For example, the exposure control portion 38a controls the infrared imaging unit 22 such that the first exposure period and the second exposure period are alternately switched. That is, the captured image data captured by the infrared imaging unit 22 constitutes moving image data where a frame in which the first region including the front row seats 14 is expressed (image-captured) with a luminance that is easy to recognize and a frame where the second region including the rear row seats 16 is expressed (image-captured) with a luminance that is easy to recognize alternately exist. For example, odd-numbered frames are image-captured in the first exposure period, and even-numbered frames are image-captured in the second exposure period. In this case, it is assumed that the luminance in the captured image is represented by, for example, 256 gradations from 0 to 255 ("0" is dark and "255" is bright). It is also assumed that the luminance of the captured image suitable for recognizing (detecting) the situation in the vehicle cabin 10a is "128" by a test or the like in advance. In this case, when an odd-numbered frame is image-captured, the first exposure period is set such that the average of the luminance of the first region is, for example, "128". Further, when an even-numbered frame is image-captured, the second exposure period is set such that the average of luminance of the second region is, for example, "128". Image-capturing in the first exposure period is performed in odd-numbered frames, and image-capturing in the second exposure period in even-numbered frames, and thus the time lag of the time of image-capturing in the first exposure period and the time of image-capturing in the second exposure period can be minimized. Therefore, it can be considered that the situation of the first region including the front row seats 14 and the situation of the second region including the rear row seats 16 are acquired at substantially the same timing. Since the installation posture of the infrared imaging unit 22 is fixed, the position corresponding to the first region and the position corresponding to the second region in the captured image data to be image-captured have been already known. Therefore, it is easy to calculate the average luminance values of the first region and the second region in the captured image data.

Figure 4:
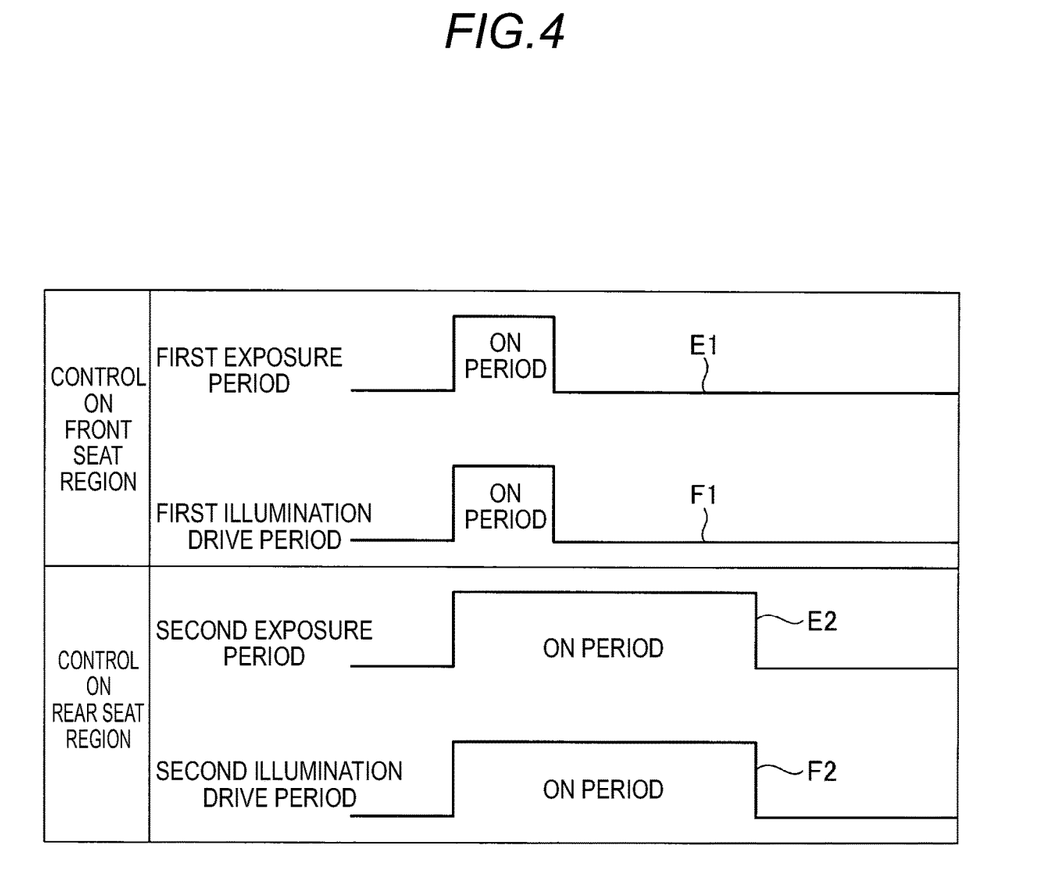
FIG. 4 is an exemplary schematic diagram illustrating an exposure period and a driving period of illumination (infrared LED) in front seats and rear seats in the imaging control device according to the embodiment.

As described above, since the first region is relatively close to the infrared imaging unit 22, when the infrared light is emitted by the infrared irradiation unit 24, the reflected light has a relatively small attenuation. As a result, the first region looks relatively bright. Therefore, as shown in FIG. 4, the first exposure period for setting the average luminance of the first region of the front row seats 14 to, for example, "128" is controlled such that the ON period is relatively short (line E1). On the other hand, since the second region is relatively farther from the infrared imaging unit 22 than the first region, when the infrared light is emitted by the infrared irradiation unit 24, the reflected light has a relatively large attenuation. As a result, the second region becomes relatively darker than the first region. Therefore, as shown in FIG. 4, the ON period of the second exposure period for setting the average luminance of the second region of the rear row seats 16 to, for example, "128" is controlled to be relatively longer than the first exposure period (line E2).

The infrared imaging unit 22 visualizes infrared rays emitted from an object or reflected by the object. Therefore, the luminance of the captured image may change in accordance with a change in the temperature of the image-capturing target or the temperature of the surroundings. Then, the exposure control portion 38a corrects the length of the first exposure period at the time of current image-capturing, for example, based on the average luminance value of the first region close to the infrared imaging unit 22 in the first captured image data captured in the first exposure period at the time of previous image-capturing, which is stored in the RAM 42, and the like. Similarly, the exposure control portion 38a corrects the length of the second exposure period at the time of current image-capturing, for example, based on the average luminance value of the second region farther from the infrared imaging unit 22 than the first region in the second captured image data captured in the second exposure period at the time of previous image-capturing, which is stored in the RAM 42, and the like. In this way, by correcting the exposure periods based on the captured image data captured previously, for example, even when the surrounding conditions (for example, temperature conditions) at the time of image-capturing change, it is possible to acquire the first captured image data and the second captured image data easy to cope with the change and expressed with appropriate luminance to make it easier to recognize the details of the captured images. The captured image data that has been captured and is as referred to for correction is, for example, with an odd-numbered frame at the first exposure period and with an even-numbered frame at the second exposure period, and fine adjustment of the exposure period may be performed with reference to odd-numbered frames or even-numbered frames over a plurality of times in the past.

As shown in FIG. 4, the exposure control portion 38a can drive the infrared irradiation unit 24 in a first illumination driving period (line F1) for infrared ray irradiation in synchronization with the first exposure period, and can drive the infrared irradiation unit 24 in a second illumination driving period (line F2) for infrared ray irradiation in synchronization with the second exposure period. In this case, the irradiation of infrared light is performed only at the time of image-capturing, which can contribute to reduction of image-capturing cost, and in addition, can reduce the amount of generated heat, which, in turn, can contribute to simplification of the structure having measures against heat.

Figure 5:
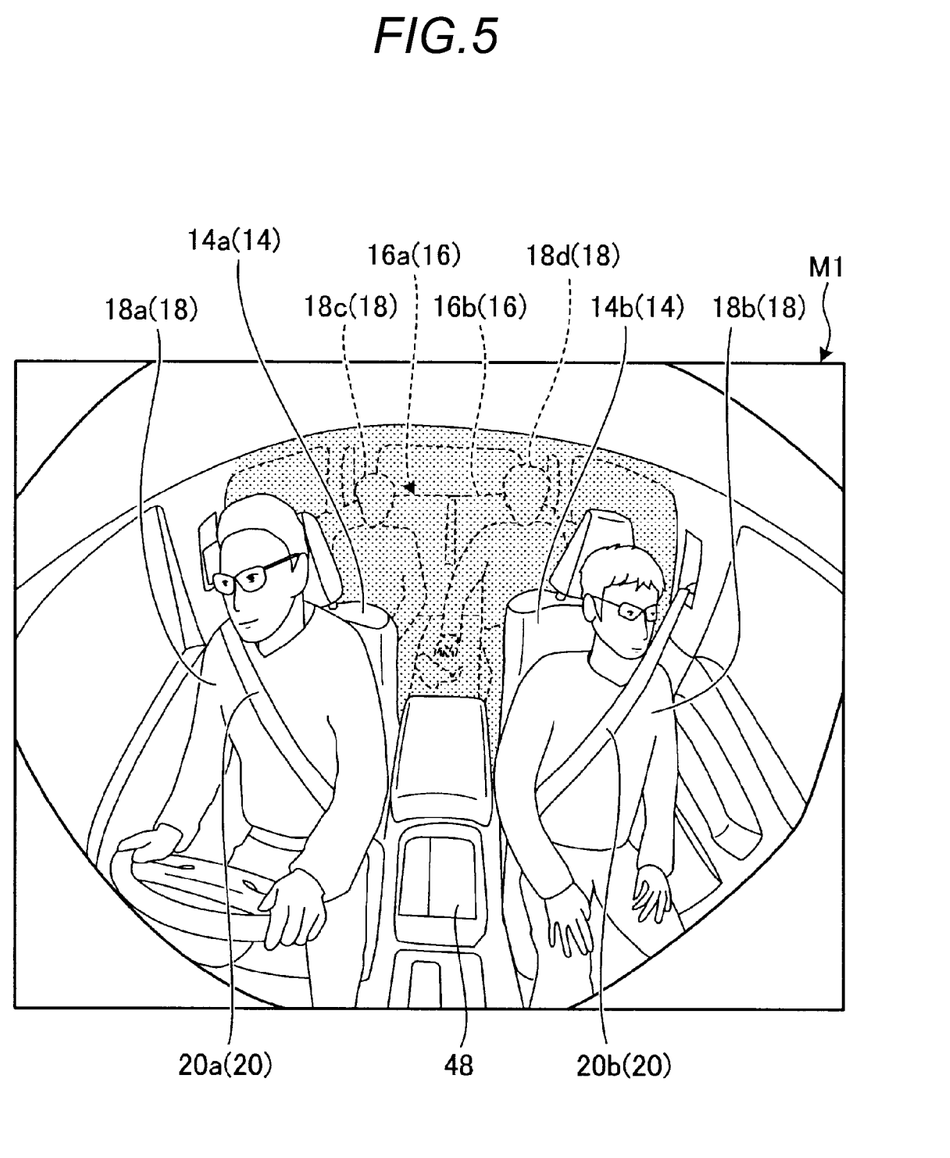
FIG. 5 is an exemplary schematic diagram illustrating a captured image of a vehicle cabin captured when exposure is performed during a first exposure period in the imaging control device according to the embodiment.
Figure 6:
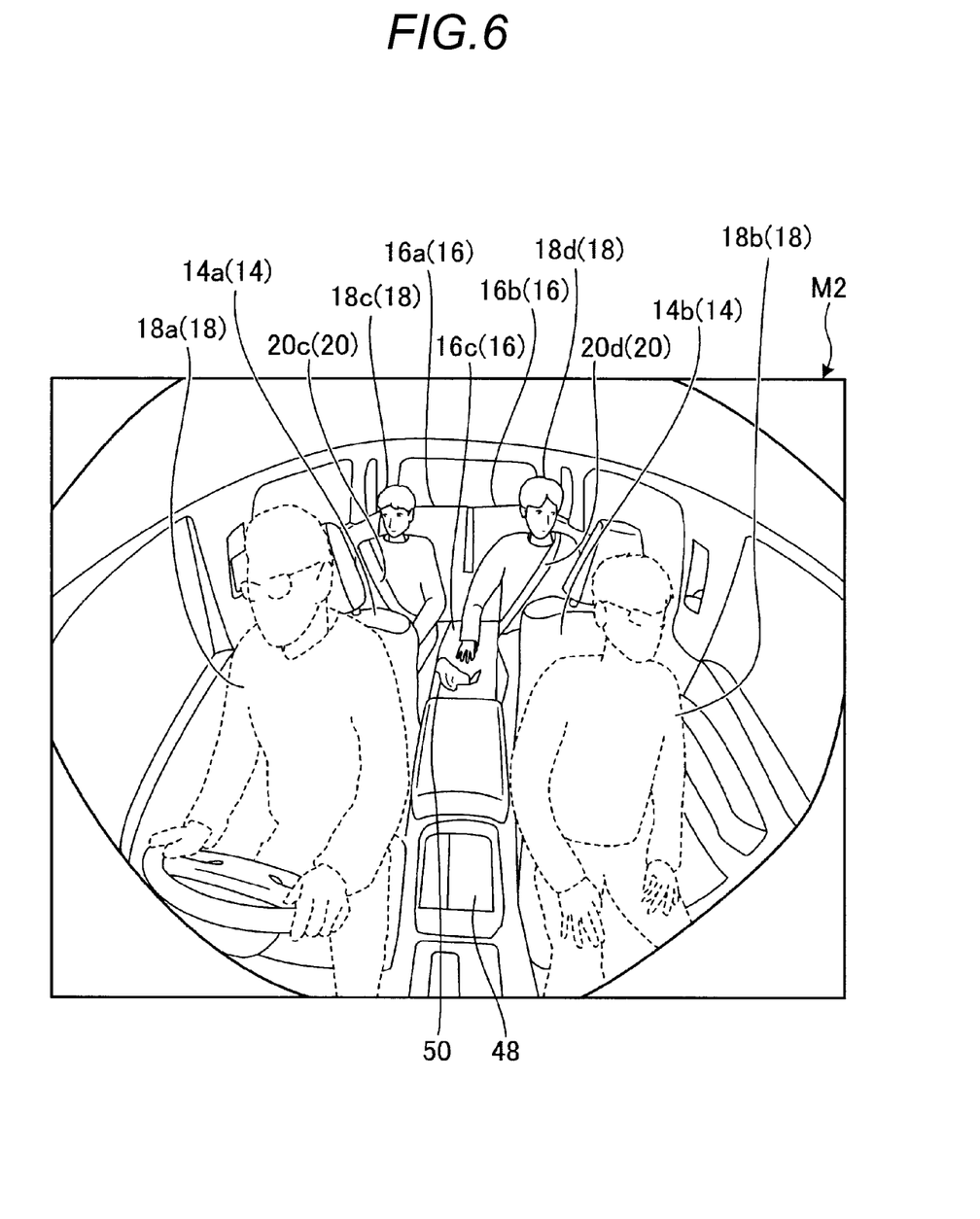
FIG. 6 is an exemplary schematic diagram illustrating a captured image of the vehicle cabin captured when exposure is performed during a second exposure period in the imaging control device according to the embodiment.

Exemplary schematic captured image data (captured images) when the exposure periods are changed in the first region including the front row seats 14 and the second region including the rear row seats 16 to capture the images as described above are illustrated in FIGS. 5 and 6. FIG. 5 illustrates first captured image data (first captured image M1) obtained as a result of capturing an image in the first exposure period such that the first region including the front row seats 14 is mainly expressed with luminance that can be easily used for control. FIG. 6 illustrates second captured image data (second captured image M2) obtained as a result of capturing an image in the second exposure period such that the second region including the rear row seats 16 is mainly expressed with luminance that can be easily used for control.

As illustrated in FIG. 1, the infrared imaging unit 22 and the infrared irradiation unit 24 are disposed substantially at the central and upper part inward of the windshield, and thus for the front row seats 14 (first region), the reflected light of the infrared light emitted by the infrared irradiation unit 24 reaches the infrared imaging unit 22 with little attenuation. Therefore, the exposure control portion 38a causes the infrared imaging unit 22 to perform image-capturing in the relatively short first exposure period, and accordingly the front row seats 14 can be captured with the first captured image M1 of luminance that can be easily recognized in which blown-out white is suppressed. Therefore, it makes it easy to recognize (detect) the occupant 18a sitting on the seat 14a (drivers seat) of the front row seats 14, the seat belt 20a worn by the occupant 18a, and the like. Similarly, it makes it easy to recognize (detect) the occupant 18b sitting on the seat 14b (passenger seat) of the front row seats 14, the seat belt 20b worn by the occupant 18b, and the like. As a result, the first captured image M1 (first captured image data) captured in the first exposure period can be used to satisfactorily perform the detection control of presence or absence of the occupant 18 of the front row seats 14 and the load (such as package), the identification control thereof, the detection control for whether or not the seat belt 20 is worn, the gesture detection control when the occupant 18 of the front row seats 14 operates the vehicle-mounted device, and the like. Further, a storage box 48 between the seat 14a and the seat 14b and the periphery thereof can be easily recognized without blown-out white. Therefore, the first captured image M1 (first captured image data) captured in the first exposure period can be used for, for example, detecting a lost object in the front row seats 14.

On the other hand, for the rear row seats 16 (second region), in a state where the reflected light of the infrared light emitted by the infrared irradiation unit 24 is attenuated as compared with the front row seats 14, image-capturing is performed in the relatively short first exposure period. Therefore, when the region of the rear row seats 16 are visualized based on the infrared reflected light that is image-captured (received) by the infrared imaging unit 22 in the first exposure period, crushed black easily occurs. As a result, it is difficult to identify the occupant 18c sitting on the seat 16a of the rear row seats 16 (rear seat behind the driver's seat), the occupant 18d sitting on the seat 16b of the rear row seats 16 (rear seat behind the passenger seat), and the like, and it is also difficult to determine whether or not the occupant 18c or the occupant 18d is wearing the seat belt 20. However, as described above, in the embodiment, the first captured image M1 is used for control for detecting the presence or absence of the occupant 18 and the load, identification control thereof, control for detecting whether or not the seat belt 20 is worn, and warning control when the seat belt 20 is not worn, and gesture detection control when the occupant 18 operates a vehicle-mounted device. That is, the first captured image M1 (first captured image data) is not intended to be visually recognized by the occupant 18 or the like directly. Therefore, even when there is crushed black on the region of the rear row seats 16 in the first captured image M1 (first captured image data) for performing recognition (detection) of the situation of the front row seats 14 and it is difficult to identify the region of the rear row seats 16, no inconvenience occurs.

The exposure control portion 38a causes the infrared imaging unit 22 to perform image-capturing in the second exposure period relatively longer than the first exposure period, and thus the infrared imaging unit 22 can receive infrared reflected light for a longer time. As a result, as illustrated in FIG. 6, the region of the rear row seats 16 can be captured with the second captured image M2 having suppressed crushed black and easily recognizable luminance. Therefore, it makes it easy to recognize (detect) the occupant 18c sitting on the seat 16a of the rear row seats 16, the seat belt 20c worn by the occupant 18c, and the like. Similarly, it makes it easy to recognize (detect) the occupant 18d sitting on the seat 16b of the rear row seats 16, the seat belt 20d worn by the occupant 18d, and the like. As a result, the second captured image M2 (second captured image data) captured in the second exposure period can be used to satisfactorily perform the detection control of presence or absence of the occupant 18 of the rear row seats 16 and the load (such as package), the identification control thereof, the detection control for whether or not the seat belt 20 is worn, and the gesture detection control when the occupant 18 of the rear row seats 16 operates the vehicle-mounted device, and the like. Further, the seat 16c between the seat 16a and the seat 16b and the object 50 (for example, clothing) placed around the seat 16c can be easily recognized without crushed black. Therefore, the second captured image M2 (second captured image data) captured in the second exposure period can be used for, for example, detecting a lost object in the rear row seats 16.

On the other hand, for the front row seats 14 (first region), in a state where the reflected light of the infrared light emitted by the infrared irradiation unit 24 is attenuated as compared with the rear row seats 16, image-capturing is performed in the second exposure period longer than the first exposure period at which appropriate luminance is obtained. Therefore, when the region of the front row seats 14 are visualized based on the infrared reflected light that is image-captured (received) by the infrared imaging unit 22 in the second exposure period, blown-out white easily occurs. As a result, it is difficult to identify the occupant 18a sitting on the seat 14a of the front row seats 14, the occupant 18b sitting on the seat 14b of the front row seats 14, and the like, and it is also difficult to determine whether or not the occupant 18a or the occupant 18b is wearing the seat belt 20. However, as described above, in the embodiment, the second captured image M2 is used for control for detecting the presence or absence of the occupant 18 and the load, identification control thereof, control for detecting whether or not the seat belt 20 is worn, and warning control when the seat belt 20 is not worn, and gesture detection control when the occupant 18 operates a vehicle-mounted device. That is, the second captured image M2 (second captured image data) is not intended to be visually recognized by the occupant 18 or the like directly. Therefore, even when there is blown-out whites on the region of the front row seats 14 in the second captured image M2 (second captured image data) for performing recognition (detection) of the situation of the rear row seats 16 and it is difficult to identify the region of the front row seats 14, no inconvenience occurs. The seats 14a and 14b of the front row seats 14, the storage box 48, and the like have a smaller amount of infrared radiation than the occupant 18, and therefore are illustrated in the example of FIG. 6 in a state in which blown-out white does not occur.

Returning to FIG. 3, the device control portion 28 acquires the first and second captured image data captured by the switching control of the first and second exposure periods via the processing unit 38c and performs various controls. For example, even though it is determined that the occupant 18a is detected in the seat 14a (drivers seat) in the acquired first captured image data (first captured image), the device control portion determines that the occupant 18a is not wearing the seat belt 20a when the signal from the seat belt sensor 36a indicating that the seat belt 20a is worn cannot be received. Therefore, the device control portion 28 can cause the output device 32 (for example, a speaker, a display lamp, or a display device) to output an alarm indicating that the seatbelt is not worn. Further, when the device control portion 28 detects a predetermined gesture by the occupant 18c of the rear row seats 16 (for example, an operation of raising the left hand above the head and moving it back and forth) based on the second captured image data (second captured image), the device control portion 28 determines that the occupant 18c is performing a gesture of opening and closing the sunroof. In that case, the device control portion 28 can drive the vehicle-mounted device 34 (for example, a sunroof opening and closing motor or the like) to open and close the sunroof. In this case, even when the occupant 18 is sitting on a seat where it is difficult to open and close the sunroof, the occupant 18 can open and close the sunroof smoothly and easily.

The above-described control of the device control portion 28 is merely an example. For example, an alarm can be output when the other occupants 18 are not wearing the seat belts 20 by using the seat belt sensors 36b to 36e. In this case, determination as to whether the seat belt 20 is being worn is not made on a seat on which the occupant 18 is not detected (recognized) or on a seat on which a package is placed. The device control portion 28 can also operate, for example, an audio device or a navigation system as the vehicle-mounted device 34, and the vehicle-mounted device 34 that is difficult to operate except a specific occupant 18 typically can be operated by a passenger instead, which can improve convenience.

Figure 7:
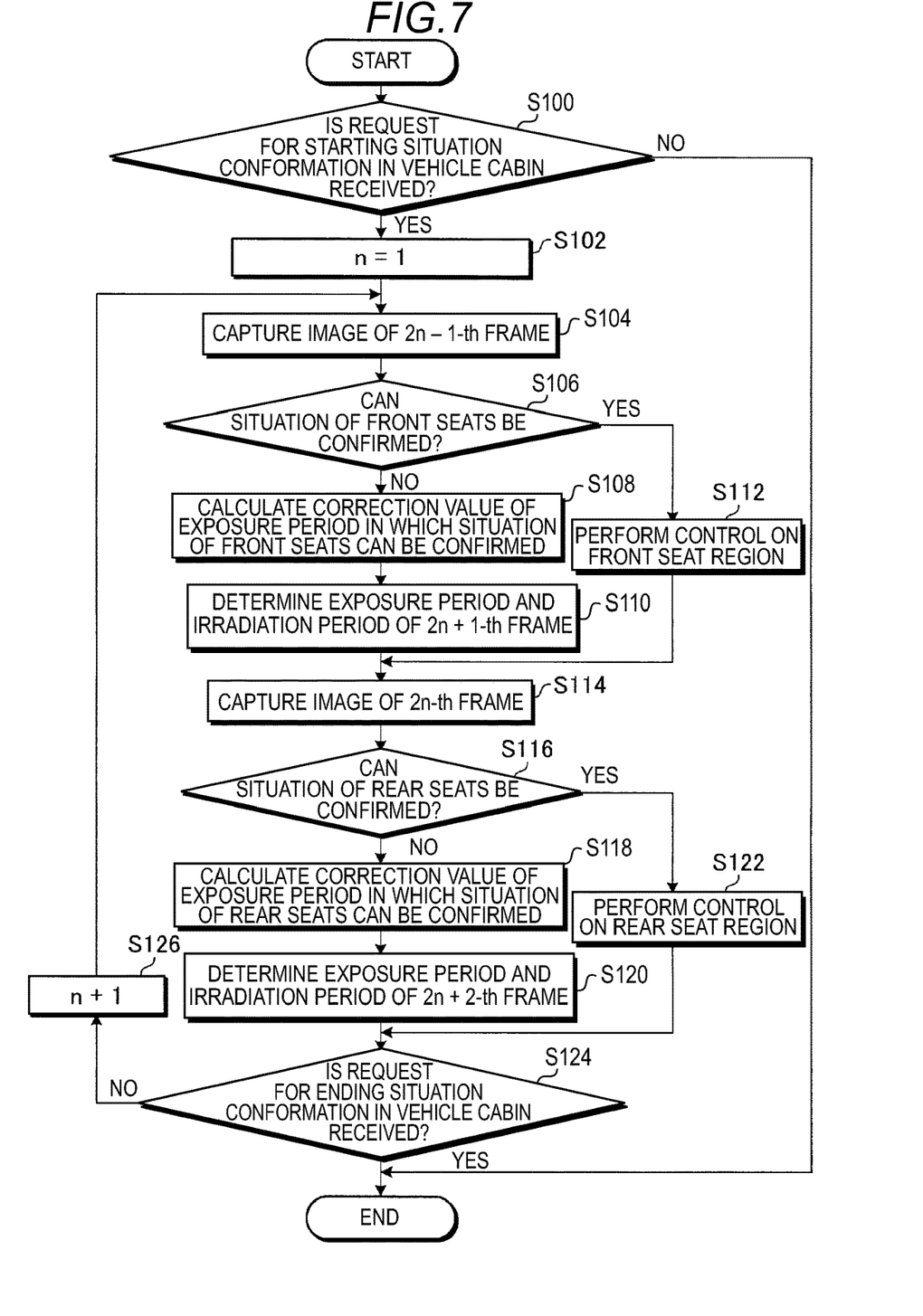
FIG. 7 is an exemplary schematic flowchart showing a process of operating the imaging control device, including a series of steps executed by the imaging control device according to the embodiment.

FIG. 7 is an exemplary schematic flowchart showing a series of steps executed by the monitoring control system 100 including the imaging control device according to the embodiment.

The ECU 26 constantly monitors whether or not a request signal for starting situation confirmation in the vehicle cabin 10a is received (S100), and when the request signal for starting the situation confirmation is not received (NO in S100), the ECU 26 temporarily end the flow. For example, the request signal for starting situation confirmation may be generated when the ignition switch of the vehicle 10 is ON and received by the ECU 26, or may be generated by a switch operation of the occupant 18 and the like and received by the ECU 26.

In S100, when the ECU 26 receives the request signal for starting situation confirmation (Yes in S100), the coefficient n for specifying the frame number at the time of image capturing is reset to "n=1" (S102). It is noted that the frame rate of the infrared imaging unit 22 of the embodiment is, for example, "30".

Subsequently, the exposure control portion 38a captures an image of the 2n−1-th frame (first frame: odd-numbered frame) in the first exposure period (initial value) for the front row seats 14 determined by a test or the like in advance (S104), and temporarily stored in the RAM 42. As described above, blown-out white or crushed black may occur even in the same exposure period depending on the environment at the time of image-capturing. Here, the image acquisition portion 38b determines whether or not the captured (acquired) first captured image data is data for which the situation of the front seats (the front row seats 14) can be confirmed (S106). For example, it is determined whether or not the average luminance of the first region corresponding to the front row seats 14 is a predetermined value, for example, "128" (for example, the allowable value ±2 may be included). When the average luminance value does not fall within the range of "128±2", it is determined that the situation of the front seats (the front row seats 14) cannot be recognized (NO in S106). Then, the exposure control portion 38a calculates a correction value (for example, −1 ms or the like) of the exposure period in which the situation of the front seats (the first region) can be confirmed (S108) in the current image-capturing environment, and determines a corrected first exposure period of a 2n+1-th frame (third frames: odd-numbered frame). At the same time, the irradiation period of the infrared irradiation unit 24 is determined corresponding to the corrected first exposure period (S110).

In step S106, when the average luminance value is in the range of "128±2", it is determined that the situation of the front seats (the front row seats 14) can be recognized (Yes in S106), and the processing unit 38c supplies the first captured image data to the device control portion 28, and performs the output control of the output device 32 and the control of the vehicle-mounted device 34 as front seat region control, according to the situation of the first region including the front row seats 14 (S112).

Subsequently, the exposure control portion 38a captures an image of the 2n-th frame (second frame: even-numbered frame) in the second exposure period (initial value) for the rear row seats 16 determined by a test or the like in advance (S114), and temporarily stored in the RAM 42. The image acquisition portion 38b determines whether or not the captured (acquired) second captured image data is data for which the situation of the rear seats (the rear row seats 16) can be confirmed (S116). For example, it is determined whether or not the average luminance of the second region corresponding to the rear row seats 16 is a predetermined value, for example, "128" (for example, the allowable value±2 may be included). When the average luminance value does not fall within the range of "128 ±2", it is determined that the situation of the rear seats (the rear row seats 16) cannot be recognized (No in S116). Then, the exposure control portion 38a calculates a correction value (for example, +3 ms or the like) of the exposure period in which the situation of the rear seats (the second region) can be confirmed (S118) in the current image-capturing environment, and determines a corrected second exposure period of a 2n+2-th frame (fourth frame: even-numbered frame). At the same time, the irradiation period of the infrared irradiation unit 24 is determined corresponding to the corrected second exposure period (S120).

In step S116, when the average luminance value is in the range of "128±2", it is determined that the situation of the rear seats (the rear row seats 16) can be recognized (Yes in S116), and the processing unit 38c supplies the second captured image data to the device control portion 28, and performs the output control of the output device 32 and the control of the vehicle-mounted device 34 as rear seat region control, according to the situation of the second region including the rear row seats 16 (S122).

When the imaging control processing by the output device 32 is being executed, the ECU 26 constantly monitors whether or not a request signal for ending the situation confirmation in the vehicle cabin 10a has been received (S124). Then, when the ECU 26 has not received the request signal for ending situation confirmation (No in S124), the exposure control portion 38a increments the coefficient n (n+1) for specifying the frame number at the time of image-capturing (S126), and the process proceeds to S104. Then, the exposure control portion 38a performs image-capturing of a third frame and image-capturing of a fourth frame. That is, the infrared imaging unit 22 repeatedly performs the image-capturing of the first captured image data of the odd-numbered frame and the second captured image data of the even-numbered frame. The output control of the output device 32 and the control of the vehicle-mounted device 34 by the device control portion 28 are repeatedly performed.

In S124, when the ECU 26 receives the request signal for ending situation confirmation (Yes in S124), the flow is temporarily ended. For example, the request signal for ending situation confirmation may be generated when the ignition switch of the vehicle 10 is OFF and received by the ECU 26, or may be generated by a switch operation of the occupant 18 and the like and received by the ECU 26.

In the flowchart of FIG. 7, the example in which the control by the device control portion 28 is performed, each time the situations of the front seats or the rear seats can be confirmed by the acquired first captured image data and second captured image data is shown. In another embodiment, the image capturing in the first exposure period and the second exposure period may be continuously performed by omitting steps of S112 and S122 for each acquisition of the first captured image data and the second captured image data, and when a predetermined number of frame capturing have been completed, the control by the device control portion 28 may be performed.

As described above, in the imaging control device, the exposure control portion 38a controls the exposure length of the infrared imaging unit 22 capable of capturing an image of the region to be occupied by the occupants 18 in the vehicle cabin 10a, at least to the first exposure period and the second exposure period longer than the first exposure period. The image acquisition portion 38b acquires first captured image data captured in the first exposure period and second captured image data captured in the second exposure period. Then, the processing unit 38c separately processes the first captured image data and the second captured image data and provides the processed data, for example, to the device control portion 28. With the configuration described above, for example, by capturing the image in the relatively short first exposure period, there is a possibility that an image may have insufficient brightness in the second region relatively far from the infrared imaging unit 22 but in the first region relatively close to the infrared imaging unit 22, the image can be captured without being too bright, that is, such that so-called "blown-out white" hardly occurs. On the other hand, by capturing the image in the second exposure period which is relatively longer than the first exposure period, there is a possibility that an image may be too bright, that is, the image may have blown-out white in the first region relatively close from the infrared imaging unit 22, but in the second region relatively far from the infrared imaging unit 22, the image can be captured without being too dark, that is, such that so-called "crushed black" hardly occurs. In other words, by switching the exposure periods, it is possible to handle image-capturing of the region that is not too bright and image-capturing of the region that is not too dark without the need for a composite process of the captured images. As a result, the first captured image data that makes it easy to recognize the situation of the vehicle cabin 10a in the first region close to the infrared imaging unit 22, and the second captured image data that makes it easy to recognize the situation of the vehicle cabin 10a in the second region far from the infrared imaging unit 22 can be both accurately acquired while reducing the device cost by reducing the composite process, which can be used for control.

Further, the above-described imaging control device 32a may perform control such that, for example, the first exposure period and the second exposure period are alternately switched. With the configuration described above, for example, the first captured image data and the second captured image data can be effectively acquired and the situation recognition of the first region and the situation recognition of the second region can be performed at substantially the same timing, which makes it possible to smoothly perform the situation recognition.

The imaging control device 32a described above may correct the length of the first exposure period at the time of current image-capturing, for example, based on the average luminance value of the first region close to the infrared imaging unit 22 in the first captured image data captured in the first exposure period at the time of previous image-capturing. In addition, the length of the second exposure period at the time of current image-capturing may be corrected based on the average luminance value of the second region farther from the infrared imaging unit 22 than the first region in the second captured image data captured in the second exposure period at the time of previous image-capturing. With the configuration described above, for example, the exposure period can be easily set corresponding to the change of surrounding conditions at the time of image-capturing, and the first captured image data and the second captured image data expressed with appropriate brightness to make it easier to recognize the details of the captured images can be acquired.

The above-described imaging control device 32a controls the length of the exposure period of the infrared imaging unit 22. With the configuration, for example, the first captured image data and the second captured image data expressed with appropriate brightness to make it easier to recognize the details of the captured images can be acquired regardless of day or night (bright state, dark state) without being recognized by the occupants 18 in the vehicle cabin 10a.

The above-described imaging control device 32a may, for example, synchronize an irradiation period of infrared light of the infrared irradiation unit 24 with which the region to be image-captured by the infrared imaging unit 22 is irradiated, with the first exposure period and the second exposure period. With the configuration described above, for example, the irradiation of infrared light can be performed only at the time of image-capturing, which can contribute to reduction of image-capturing cost, and in addition, can reduce the amount of generated heat, which, in turn, can contribute to simplification of the structure having measures against heat.

Although the case where an image is captured by the infrared imaging unit 22 has been described in the above-described embodiment, for example, a time-of-flight (TOF) camera may be used as the imaging unit, and similarly, switching control between the first exposure period and the second exposure period may be performed. Even in this case, it is possible to acquire a captured image in which blown-out white and crushed black is suppressed and thus the situation of the first region including the front row seats 14 and the situation of the second region including the rear row seats 16 can be well recognized, and possible to obtain the same effect as when the infrared imaging unit 22 is used.

In the example described above, the length of the exposure period is changed in the first region including the front row seats 14 and the second region including the rear row seats 16. In another embodiment, for example, the imaging control device can be applied to a three-row seat vehicle. In that case, a first exposure period for the first region including a front row seats, a second exposure period for the second region including middle row seats, and a third exposure period for a third region including the rear row seats are set, and the switching control of the exposure periods is performed such that the exposure time becomes longer as the distance from the infrared imaging unit 22 increases. As a result, it is possible to acquire a captured image in which blown-out white and crushed black are suppressed and the situation of each region can be well recognized, and the same effect as in the case of the two-row seats described above can be obtained. The same applies to a four-row seat vehicle or more.

The imaging control program executed by the CPU 38 of the embodiment may be a file in an installable or executable format and be provided with being recorded on a computer-readable recording medium such as a CD-ROM, a flexible disk (FD), a CD-R, a digital versatile disk (DVD).

Further, the imaging control program may be stored on a computer connected to a network such as the Internet, and provided by being downloaded through the network. In addition, the imaging control program executed in the embodiment may be provided or distributed through a network such as the Internet.

Although the embodiments and modification of the present disclosure have been described, these embodiments and modifications are presented as examples, and are not intended to limit the scope of the disclosure. The novel embodiments can be implemented in various ways, and various omissions, replacements, and changes can be made without departing from the spirit of the disclosure. The embodiments and modifications thereof are included in the scope and spirit of the disclosure, and are also included in the invention described in the claims and their equivalents.

An imaging control device according to an aspect of this disclosure includes, for example, an exposure control portion configured to control an exposure length of an imaging unit, which is capturable an image of a region where an occupant is allowed to occupy in a vehicle cabin, to at least a first exposure period and a second exposure period longer than the first exposure period, an image acquisition portion configured to acquire first captured image data captured in the first exposure period and second captured image data captured in the second exposure period, and a processing unit configured to separately process the first captured image data and the second captured image data. With the configuration described above, for example, by capturing the image in the relatively short first exposure period, there is a possibility that an image may have insufficient brightness in a region relatively far from the imaging unit but in a region relatively close to the imaging unit, the image can be captured without being too bright, that is, such that so-called "blown-out white" hardly occurs. On the other hand, by capturing the image in the second exposure period which is relatively longer than the first exposure period, there is a possibility that the image may be too bright in a region relatively close from the imaging unit, but in a region relatively far from the imaging unit, the image can be captured without being too dark, that is, such that so-called "crushed black" hardly occurs. In other words, by switching the exposure periods and separately handling the captured image data, it is possible to handle image-capturing of a region that is not too bright and image-capturing of a region that is not too dark without the need for a composite process of the captured images. As a result, the captured image data that makes it easy to recognize the situation of the vehicle cabin in the region close to the imaging unit, and the captured image data that makes it easy to recognize the situation of the vehicle cabin in the region far from the imaging unit can be both accurately acquired while reducing the device cost by reducing the composite process, which can be used for control.

The exposure control portion of the imaging control device according to the aspect of this disclosure may, for example, perform control such that the first exposure period and the second exposure period are alternately switched. With the configuration described above, for example, the first captured image data and the second captured image data can be effectively acquired and the situation recognition of the first region and the situation recognition of the second region can be performed at substantially the same timing, which makes it possible to smoothly perform the situation recognition.

The exposure control portion of the imaging control device according to the aspect of this disclosure may, for example, correct a length of the first exposure period at a time of current image-capturing based on an average luminance value of a first region close to the imaging unit in the first captured image data captured in the first exposure period at a time of previous image-capturing, and correct a length of the second exposure period at the time of current image-capturing based on an average luminance value of a second region farther away from the imaging unit than the first region in the second captured image data captured in the second exposure period at the time of previous image-capturing. With the configuration described above, for example, the exposure period can be easily set corresponding to the change of surrounding conditions at the time of image-capturing, and the first captured image data and the second captured image data expressed with appropriate brightness to make it easier to recognize the details of the captured images can be acquired.

The exposure control portion of the imaging control device according to the aspect of this disclosure may, for example, control a length of an exposure period of an infrared imaging unit that captures an infrared image as the imaging unit. With the configuration described above, for example, the first captured image data and the second captured image data expressed with appropriate brightness to make it easier to recognize the details of the captured images can be acquired regardless of day or night (bright state, dark state) without being recognized by occupants in the vehicle cabin.

The exposure control portion of the imaging control device according to the aspect of this disclosure may, for example, synchronize an irradiation period of infrared light with which a region capturable by the infrared imaging unit is irradiated, with the first exposure period and the second exposure period. With the configuration described above, for example, the irradiation of infrared light can be performed only at the time of image-capturing, which can contribute to reduction of image-capturing cost, and in addition, can reduce the amount of generated heat, which, in turn, can contribute to simplification of the structure having measures against heat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An imaging control device comprising:
at least one hardware processor configured to implement:
an exposure control portion configured to control an exposure length of an imaging unit, which is capturable an image of a region where an occupant is allowed to occupy in a vehicle cabin, to at least a first exposure period and a second exposure period longer than the first exposure period;
an image acquisition portion configured to acquire first captured image data captured in the first exposure period and second captured image data captured in the second exposure period, the first captured image data and the second captured image data capturing images from a same imaging area;
a processing unit configured to separately process the first captured image data and the second captured image data and provide the processed first captured image data and the processed second captured image data to a device control portion; and
the device control portion executes monitoring control using the respective images of the first captured image data and the second captured image data,
wherein the device control portion executes monitoring control by using a first region close to the imaging unit in the first captured image data and a second region farther away from the imaging unit than the first region in the second captured image data.

2. The imaging control device according to claim 1, wherein
the exposure control portion performs control such that the first exposure period and the second exposure period are alternately switched.

3. The imaging control device according to claim 1, wherein
the exposure control portion corrects a length of the first exposure period at a time of current image-capturing based on an average luminance value of the first region close to the imaging unit in the first captured image data captured in the first exposure period at a time of previous image-capturing, and corrects a length of the second exposure period at the time of current image-capturing based on an average luminance value of the second region farther away from the imaging unit than the first region in the second captured image data captured in the second exposure period at the time of previous image-capturing.

4. The imaging control device according to claim 1, wherein the exposure control portion controls a length of an exposure period of an infrared imaging unit that captures an infrared image as the imaging unit.

5. The imaging control device according to claim 4, wherein the exposure control portion synchronizes an irradiation period of infrared light with which a region capturable by the infrared imaging unit is irradiated, with the first exposure period and the second exposure period.

* * * * *